US012671528B2

(12) United States Patent
Loehr et al.

(10) Patent No.: US 12,671,528 B2
(45) Date of Patent: Jun. 30, 2026

(54) TRANSMITTING A PRIORITIZED TRANSPORT BLOCK

(71) Applicant: Lenovo (Singapore) Pte. Ltd., New Tech Park (SG)

(72) Inventors: Joachim Loehr, Wiesbaden (DE); Alexander Johann Maria Golitschek Edler von Elbwart, Darmstadt (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 459 days.

(21) Appl. No.: 18/025,371

(22) PCT Filed: Sep. 8, 2021

(86) PCT No.: PCT/IB2021/058170
§ 371 (c)(1),
(2) Date: Mar. 8, 2023

(87) PCT Pub. No.: WO2022/053949
PCT Pub. Date: Mar. 17, 2022

(65) Prior Publication Data
US 2024/0014951 A1     Jan. 11, 2024

Related U.S. Application Data

(60) Provisional application No. 63/075,733, filed on Sep. 8, 2020.

(51) Int. Cl.
*H04L 1/1867*     (2023.01)
*H04L 5/00*     (2006.01)

(52) U.S. Cl.
CPC .......... *H04L 1/1887* (2013.01); *H04L 5/0064* (2013.01)

(58) Field of Classification Search
None
See application file for complete search history.

(56) References Cited

U.S. PATENT DOCUMENTS 10,790,943 B2 *    9/2020   Kim .................. H04W 72/1268
11,871,407 B2 *    1/2024   Wei ....................... H04L 1/1874
(Continued)

FOREIGN PATENT DOCUMENTS

TW        200746706 A     12/2007
WO        2020094124 A1    5/2020

OTHER PUBLICATIONS

PCT/IB2021/058170, "Notification of Transmittal of the International Search Report and the Written Opinion of the International Searching Authority, or the Declaration", International Searching Authority, Dec. 1, 2021, pp. 1-13.
(Continued)

*Primary Examiner* — Anh Vu H Ly
(74) *Attorney, Agent, or Firm* — Kunzler Needham Hilton

(57)     ABSTRACT

Apparatuses, methods, and systems are disclosed for transmitting a prioritized transport block. One method includes determining, at a user equipment, a first priority corresponding to a first transport block associated with a first hybrid automatic repeat request process pending for retransmission on a configured uplink grant resource. The method includes determining a second priority corresponding to an initial transmission on the configured uplink grant resource of a second transport block associated with a second hybrid automatic repeat request process. The method includes selecting the second hybrid automatic repeat request process and transmitting the initial transmission of the second transport block on the configured uplink grant resource before retransmitting the first transport block.

20 Claims, 6 Drawing Sheets

(56) References Cited

U.S. PATENT DOCUMENTS

| | | | | |
|---|---|---|---|---|
| 2020/0337083 A1* | 10/2020 | Loehr | ............... | H04W 72/1263 |
| 2021/0105103 A1* | 4/2021 | Bhattad | ................ | H04L 5/0055 |
| 2022/0191902 A1* | 6/2022 | Nunome | .......... | H04W 74/0808 |
| 2023/0078336 A1* | 3/2023 | Lee | ....................... | H04L 1/1887 |
| | | | | 370/329 |
| 2024/0022356 A1* | 1/2024 | Lee | ....................... | H04W 72/23 |

OTHER PUBLICATIONS

Samsung, "Prioritization between initial TX and re-TX on CG in Nr-U", 3GPP TSG-RAN WG2 Meeting #109-e-Bis R2-2002614, Apr. 20-30, 2020, pp. 1-4.

Vivo, "Harmonizing CG enhancements in NR-U and URLLC/IIoT", 3GPP TSG RAN WG2#111 electronic R2-2007146, Aug. 17-28, 2020, pp. 1-2.

3GPP, "3rd Generation Partnership Project; Technical Specification Group Services and System Aspects; Study on enhancement of 5G System (5GS) for vertical and Local Area Network (LAN) services (Release 16)", 3GPP TR 23.734 V16.2.0, Jun. 2019, pp. 1-117.

3GPP, "3rd Generation Partnership Project; Technical Specification Group Radio Access Network; Physical layer procedures for shared spectrum channel access (Release 16)", 3GPP TS 37.213 V16.2.0, Jun. 2020, pp. 1-26.

3GPP, "3rd Generation Partnership Project; Technical Specification Group Radio Access Network; NR; Medium Access Control (MAC) protocol specification (Release 16)", 3GPP TS 38.321 V16.1.0, Jul. 2020, pp. 1-151.

\* cited by examiner

100

104

104

102

104

102

102

200

300

600

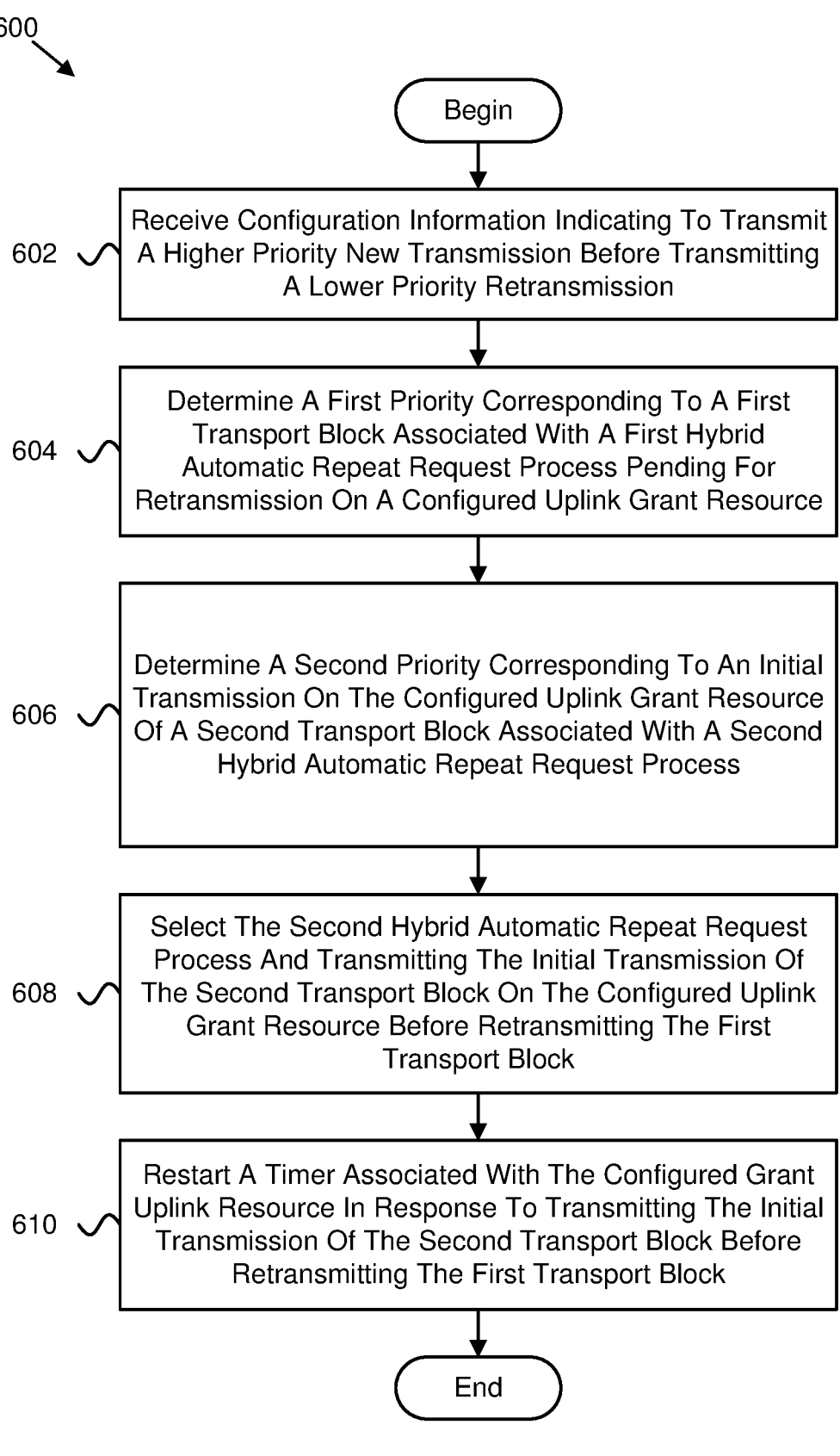

Begin

602 — Receive Configuration Information Indicating To Transmit A Higher Priority New Transmission Before Transmitting A Lower Priority Retransmission 604 — Determine A First Priority Corresponding To A First Transport Block Associated With A First Hybrid Automatic Repeat Request Process Pending For Retransmission On A Configured Uplink Grant Resource 606 — Determine A Second Priority Corresponding To An Initial Transmission On The Configured Uplink Grant Resource Of A Second Transport Block Associated With A Second Hybrid Automatic Repeat Request Process 608 — Select The Second Hybrid Automatic Repeat Request Process And Transmitting The Initial Transmission Of The Second Transport Block On The Configured Uplink Grant Resource Before Retransmitting The First Transport Block 610 — Restart A Timer Associated With The Configured Grant Uplink Resource In Response To Transmitting The Initial Transmission Of The Second Transport Block Before Retransmitting The First Transport Block End

FIG. 6

TRANSMITTING A PRIORITIZED TRANSPORT BLOCK

CROSS-REFERENCE TO RELATED APPLICATIONS

This application claims priority to U.S. Patent Application Ser. No. 63/075,733 entitled "APPARATUSES, METHODS, AND SYSTEMS FOR RECOVERY MECHANISMS FOR URLLC TRAFFIC OPERATED IN A SHARED OR UNLICENSED SPECTRUM" and filed on Sep. 8, 2020 for Joachim Loehr, which is incorporated herein by reference in its entirety.

FIELD

The subject matter disclosed herein relates generally to wireless communications and more particularly relates to transmitting a prioritized transport block.

BACKGROUND

In certain wireless communications networks, certain communications may have a higher urgency than other communications. In such networks, communications with higher urgency may not be prioritized over other communications.

BRIEF SUMMARY

Methods for transmitting a prioritized transport block are disclosed. Apparatuses and systems also perform the functions of the methods. One embodiment of a method includes determining, at a user equipment, a first priority corresponding to a first transport block associated with a first hybrid automatic repeat request process pending for retransmission on a configured uplink grant resource. In some embodiments, the method includes determining a second priority corresponding to an initial transmission on the configured uplink grant resource of a second transport block associated with a second hybrid automatic repeat request process. In certain embodiments, the method includes selecting the second hybrid automatic repeat request process and transmitting the initial transmission of the second transport block on the configured uplink grant resource before retransmitting the first transport block.

One apparatus for transmitting a prioritized transport block includes a user equipment. In some embodiments, the apparatus includes a transmitter. In various embodiments, the apparatus includes a processor that: determines a first priority corresponding to a first transport block associated with a first hybrid automatic repeat request process pending for retransmission on a configured uplink grant resource; determines a second priority corresponding to an initial transmission on the configured uplink grant resource of a second transport block associated with a second hybrid automatic repeat request process; and selects the second hybrid automatic repeat request process. The transmitter transmits the initial transmission of the second transport block on the configured uplink grant resource before retransmitting the first transport block.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 6 is a flow chart diagram illustrating another embodiment of a method for transmitting a prioritized transport block.

DETAILED DESCRIPTION

Figure 1:
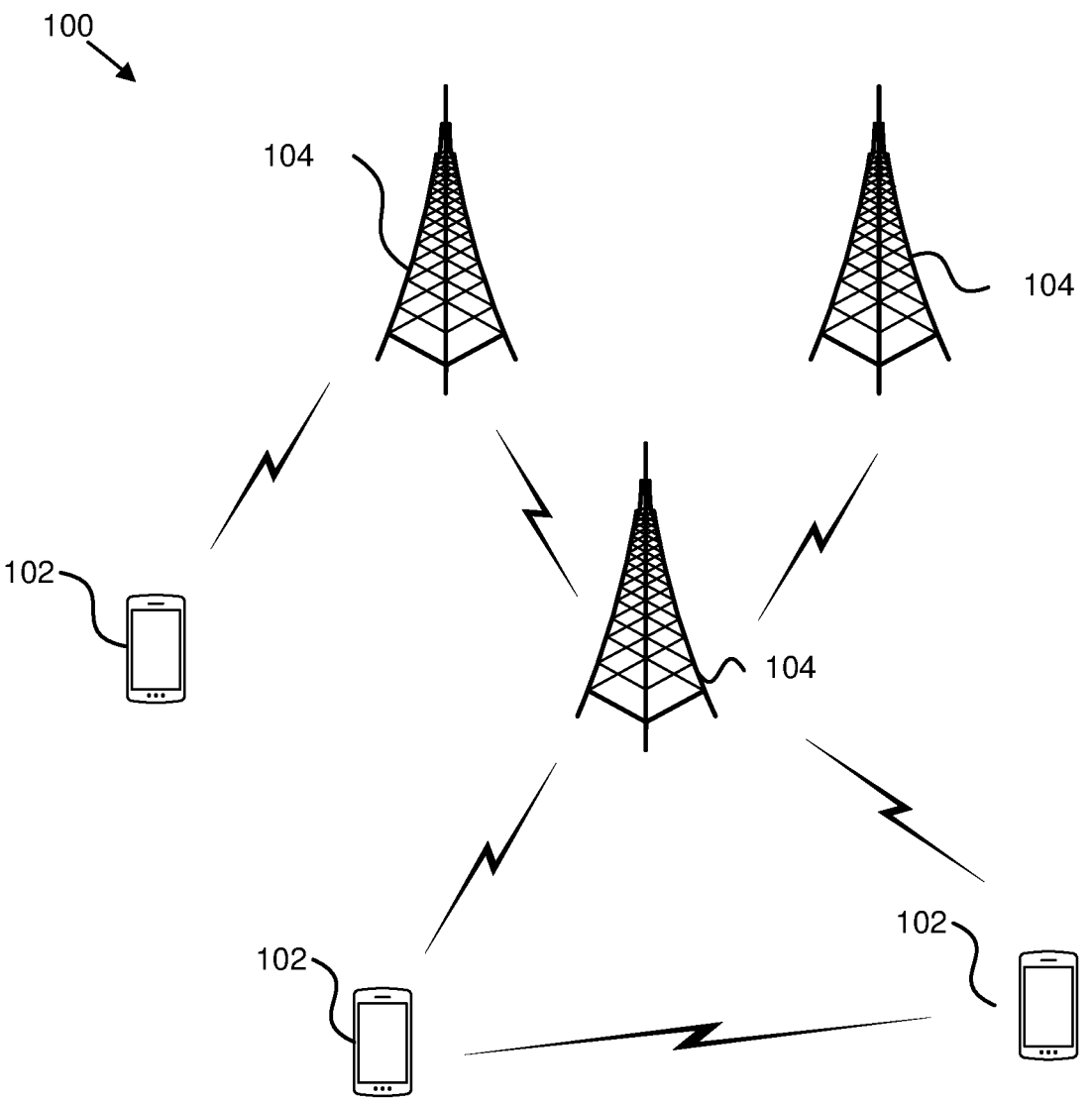
FIG. 1 is a schematic block diagram illustrating one embodiment of a wireless communication system for transmitting a prioritized transport block.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enu-
merated steps of the depicted embodiment. It will also be
noted that each block of the block diagrams and/or flowchart
diagrams, and combinations of blocks in the block diagrams
and/or flowchart diagrams, can be implemented by special
purpose hardware-based systems that perform the specified
functions or acts, or combinations of special purpose hard-
ware and code.

The description of elements in each figure may refer to
elements of proceeding figures. Like numbers refer to like
elements in all figures, including alternate embodiments of
like elements.

FIG. 1 depicts an embodiment of a wireless communica-
tion system 100 for transmitting a prioritized transport
block. In one embodiment, the wireless communication
system 100 includes remote units 102 and network units
104. Even though a specific number of remote units 102 and
network units 104 are depicted in FIG. 1, one of skill in the
art will recognize that any number of remote units 102 and
network units 104 may be included in the wireless commu-
nication system 100.

In one embodiment, the remote units 102 may include
computing devices, such as desktop computers, laptop com-
puters, personal digital assistants ("PDAs"), tablet comput-
ers, smart phones, smart televisions (e.g., televisions con-
nected to the Internet), set-top boxes, game consoles,
security systems (including security cameras), vehicle on-
board computers, network devices (e.g., routers, switches,
modems), aerial vehicles, drones, or the like. In some
embodiments, the remote units 102 include wearable
devices, such as smart watches, fitness bands, optical head-
mounted displays, or the like. Moreover, the remote units
102 may be referred to as subscriber units, mobiles, mobile
stations, users, terminals, mobile terminals, fixed terminals,
subscriber stations, UE, user terminals, a device, or by other
terminology used in the art. The remote units 102 may
communicate directly with one or more of the network units
104 via UL communication signals. In certain embodiments,
the remote units 102 may communicate directly with other
remote units 102 via sidelink communication.

The network units 104 may be distributed over a geo-
graphic region. In certain embodiments, a network unit 104
may also be referred to and/or may include one or more of
an access point, an access terminal, a base, a base station, a
location server, a core network ("CN"), a radio network
entity, a Node-B, an evolved node-B ("eNB"), a 5G node-B
("gNB"), a Home Node-B, a relay node, a device, a core
network, an aerial server, a radio access node, an access
point ("AP"), new radio ("NR"), a network entity, an access
and mobility management function ("AMF"), a unified data
management ("UDM"), a unified data repository ("UDR"),
a UDM/UDR, a policy control function ("PCF"), a radio
access network ("RAN"), a network slice selection function
("NSSF"), an operations, administration, and management
("OAM"), a session management function ("SMF"), a user
plane function ("UPF"), an application function, an authen-
tication server function ("AUSF"), security anchor function-
ality ("SEAF"), trusted non-3GPP gateway function
("TNGF"), or by any other terminology used in the art. The
network units 104 are generally part of a radio access
network that includes one or more controllers communica-
bly coupled to one or more corresponding network units
104. The radio access network is generally communicably
coupled to one or more core networks, which may be
coupled to other networks, like the Internet and public
switched telephone networks, among other networks. These and other elements of radio access and core networks are not
illustrated but are well known generally by those having
ordinary skill in the art.

In one implementation, the wireless communication sys-
tem 100 is compliant with NR protocols standardized in
third generation partnership project ("3GPP"), wherein the
network unit 104 transmits using an OFDM modulation
scheme on the downlink ("DL") and the remote units 102
transmit on the uplink ("UL") using a single-carrier fre-
quency division multiple access ("SC-FDMA") scheme or
an orthogonal frequency division multiplexing ("OFDM")
scheme. More generally, however, the wireless communi-
cation system 100 may implement some other open or
proprietary communication protocol, for example, WiMAX,
institute of electrical and electronics engineers ("IEEE")
802.11 variants, global system for mobile communications
("GSM"), general packet radio service ("GPRS"), universal
mobile telecommunications system ("UMTS"), long term
evolution ("LTE") variants, code division multiple access
2000 ("CDMA2000"), Bluetooth®, ZigBee, Sigfoxx,
among other protocols. The present disclosure is not
intended to be limited to the implementation of any particu-
lar wireless communication system architecture or protocol.

The network units 104 may serve a number of remote
units 102 within a serving area, for example, a cell or a cell
sector via a wireless communication link. The network units
104 transmit DL communication signals to serve the remote
units 102 in the time, frequency, and/or spatial domain.

In various embodiments, a remote unit 102 may deter-
mine, at a user equipment, a first priority corresponding to
a first transport block associated with a first hybrid auto-
matic repeat request process pending for retransmission on
a configured uplink grant resource. In some embodiments,
the remote unit 102 may determine a second priority corre-
sponding to an initial transmission on the configured uplink
grant resource of a second transport block associated with a
second hybrid automatic repeat request process. In certain
embodiments, the remote unit 102 may select the second
hybrid automatic repeat request process and transmit the
initial transmission of the second transport block on the
configured uplink grant resource before retransmitting the
first transport block. Accordingly, the remote unit 102 may
be used for transmitting a prioritized transport block.

Figure 2:
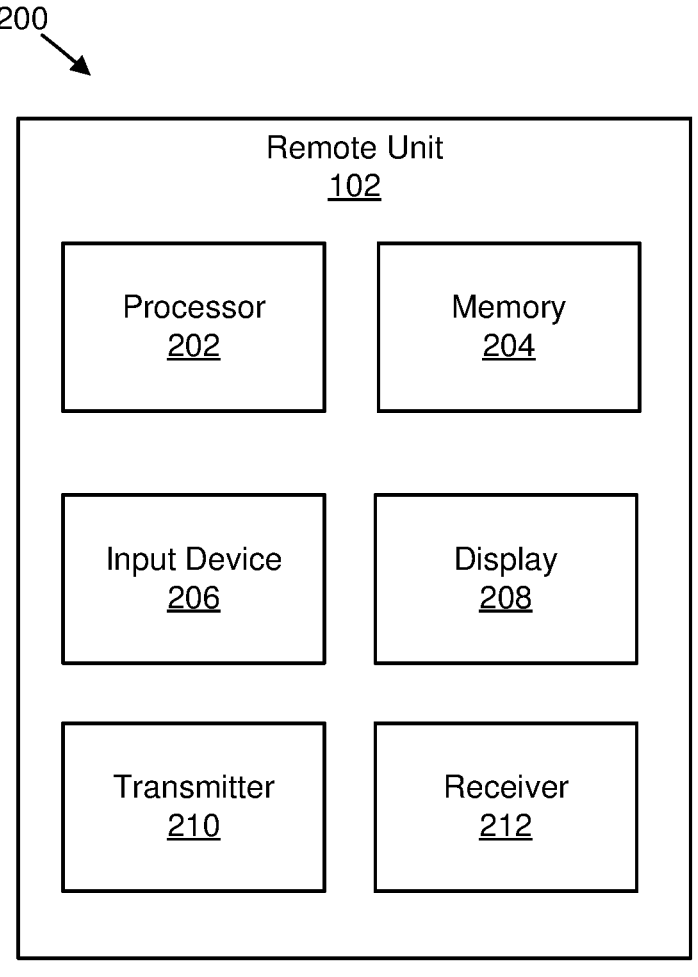
FIG. 2 is a schematic block diagram illustrating one embodiment of an apparatus that may be used for transmitting a prioritized transport block.

FIG. 2 depicts one embodiment of an apparatus 200 that
may be used for transmitting a prioritized transport block.
The apparatus 200 includes one embodiment of the remote
unit 102. Furthermore, the remote unit 102 may include a
processor 202, a memory 204, an input device 206, a display
208, a transmitter 210, and a receiver 212. In some embodi-
ments, the input device 206 and the display 208 are com-
bined into a single device, such as a touchscreen. In certain
embodiments, the remote unit 102 may not include any input
device 206 and/or display 208. In various embodiments, the
remote unit 102 may include one or more of the processor
202, the memory 204, the transmitter 210, and the receiver
212, and may not include the input device 206 and/or the
display 208.

The processor 202, in one embodiment, may include any
known controller capable of executing computer-readable
instructions and/or capable of performing logical operations.
For example, the processor 202 may be a microcontroller, a
microprocessor, a central processing unit ("CPU"), a graph-
ics processing unit ("GPU"), an auxiliary processing unit, a
field programmable gate array ("FPGA"), or similar pro-
grammable controller. In some embodiments, the processor
202 executes instructions stored in the memory 204 to
perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the processor 202: determines a first priority corresponding to a first transport block associated with a first hybrid automatic repeat request process pending for retransmission on a configured uplink grant resource; determines a second priority corresponding to an initial transmission on the configured uplink grant resource of a second transport block associated with a second hybrid automatic repeat request process; and selects the second hybrid automatic repeat request process. The transmitter 210 transmits the initial transmission of the second transport block on the configured uplink grant resource before retransmitting the first transport block.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
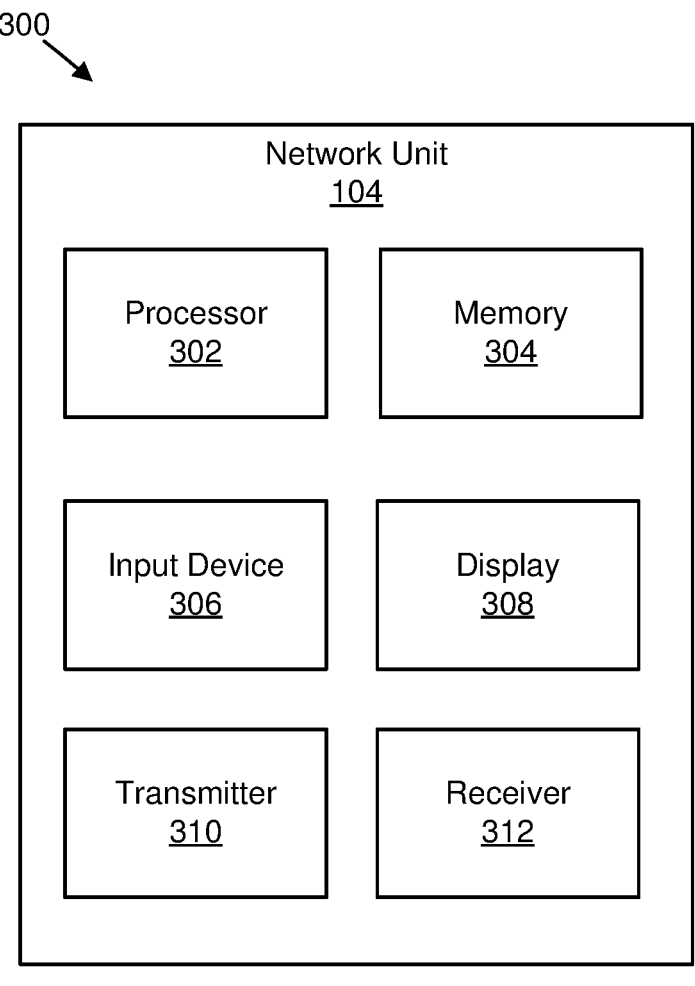
FIG. 3 is a schematic block diagram illustrating one embodiment of an apparatus that may be used for transmitting a prioritized transport block.

FIG. 3 depicts one embodiment of an apparatus 300 that may be used for transmitting a prioritized transport block. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, there may be enhanced industrial internet of things ("IoT") and ultra-reliable and low latency communication ("URLLC") support for new radio ("NR").

In some embodiments, achievable latency and reliability performance of NR may be used to support configurations with tight requirements. To extend NR applicability in various verticals, enhancements of radio access network ("RAN") features in different layers may be specified.

In various embodiments, support of unlicensed operation may enable operation on a frequency range 1 ("FR1") (e.g., in controlled environments). In such embodiments, the environment may contain only devices operating on the unlicensed band installed by a facility owner and where unexpected interference from other systems and/or radio access technology may only sporadically happen.

In certain embodiments, if a timer (e.g., cg-RetransmissonTimer) is not configured and a mobile communication system is operated in a shared spectrum access, even though there is a controlled environment, a listen-before-talk ("LBT") failure may occur. In such embodiments, there may be a risk that high priority data may be lost since an autonomous retransmission functionality may not be supported (e.g., auto-retransmission may be tied to a cg-RetransmissonTimer).

In some embodiments, if a timer (e.g., cg-RetransmissonTimer) and a logical channel based prioritization (e.g., lch-basedPrioritization) are configured concurrently, an UL grant may be deprioritized and a corresponding hybrid automatic repeat request ("HARQ") process may be pending. This may lead to a situation where two autonomous transmission (or retransmission) functionalities may be applied simultaneously by a user equipment ("UE") (e.g., autonomous retransmission according to a Rel-16 NR-U functionality/specification and autonomous transmission according to a Rel-16 IIoT/URLLC functionality/specification).

In various embodiments, multiple configured grants of a bandwidth part ("BWP") may be explicitly configured to share a common pool of HARQ processes. If HARQ processes are shared, the same configuredGrantTimer value may be configured for configured grant ("CG") configurations. However, in such embodiments, only the configuredGrantTimer value may be the same for the HARQ processes which are shared, whereas there is no requirement for the CG-RetransmissionTimer. Hence, it may be possible that different CG configurations may be configured with different CG-RetransmissionTimer values. In such configurations, a UE does not know which CG-Retransmission-Timer value should be used for a shared HARQ process.

In certain embodiments, a UE considers an uplink ("UL") grant (e.g., configured uplink grant) as de-prioritized if a corresponding uplink transmission (e.g., CG physical uplink shared channel ("PUSCH") transmission) cannot be performed due to an LBT failure. In such embodiments, if a cg-RetransmissonTimer is not configured when operating in a shared spectrum access, to cope with LBT failures which may still occur, an autonomous transmission functionality for industrial IoT ("IIoT") may be applied. In one implementation of such embodiments, a UE switches the priority status of an UL grant from prioritized to deprioritized upon receiving an LBT failure indication for the corresponding UL transmission from lower layers. In one example, the UE may have a prioritized UL grant (e.g., configured uplink grant that is a prioritized grant according to prioritization rules). In a shared spectrum, the UE needs to get access to a channel before being able to make an uplink transmission (e.g., the UE needs to perform channel sensing and/or an LBT operation before being allowed to make the uplink transmission corresponding to the prioritized UL grant). If a transmission of a prioritized UL grant cannot take place due to an unsuccessful clear channel assessment ("CCA") (e.g., LBT failure), a UE and/or a medium access control ("MAC") may change a priority status of the UL grant from prioritized to deprioritized. In some embodiments, a UE may autonomously transmit (or retransmit) data of a deprioritized UL grant in a subsequent CG grant associated with the same HARQ process.

In various embodiments, a UE starts a timer (e.g., ConfiguredGrantTimer) if LBT failure occurs for an uplink transmission (e.g., CG PUSCH transmission) and another timer (e.g., cg-RetransmissonTimer) is not configured.

In certain embodiments, if a timer (e.g., cg-RetransmissonTimer) and a logical channel based prioritization (e.g., lch-basedPrioritization) are configured concurrently for a UE and/or MAC, the UE performs an UL grant prioritization functionality. If there are colliding and/or overlapping uplink grants and/or transmissions (e.g., and for autonomous retransmissions) (e.g., retransmission triggered by LBT failure—if there is a retransmission opportunity, e.g., configured uplink grant—for an autonomous retransmission which collides with some other UL grant or UL transmission), the UE compares the priority of the two colliding UL transmissions and chooses the higher priority uplink transmission for further processing and/or transmission (e.g., prioritized UL grant). In some embodiments, a priority of an UL transmission and/or grant may be determined based on rules specified for IIoT. In various embodiments, a priority of an uplink grant may be determined by a highest priority among priorities of logical channels with data available that are multiplexed or may be multiplexed in a MAC protocol data unit ("PDU"), according to mapping restrictions. In certain embodiments, a priority of an uplink grant for which no data for logical channels is multiplexed or may be multiplexed in the MAC PDU may be lower than either the priority of an uplink grant for which data for any logical channels is multiplexed or may be multiplexed in the MAC PDU, or the priority of the logical channel triggering a scheduling request ("SR"). In some embodiments, if an overlapping uplink transmission has a higher priority than an autonomous retransmission, a UE may continue with the higher priority uplink transmission and postpone the autonomous retransmission until a later UL grant (e.g., a subsequent configured uplink grant). In various embodiments, a UE considers only a configured grant as available for an autonomous retransmission if there is no overlapping uplink transmission (e.g., on PUSCH) which has a higher priority.

In certain embodiments, a UE restarts a timer (e.g., CG-RetransmissionTimer) if retransmission could not be performed due to some higher priority uplink transmission. In some embodiments, a HARQ process is considered pending if a retransmission could not be performed due to some higher priority uplink transmission (e.g., retransmission is pre-empted by some higher priority new transmission).

Figure 4:
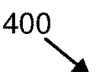
FIG. 4 is a timing diagram illustrating one embodiment of a failed configured uplink grant.
Figure 4:
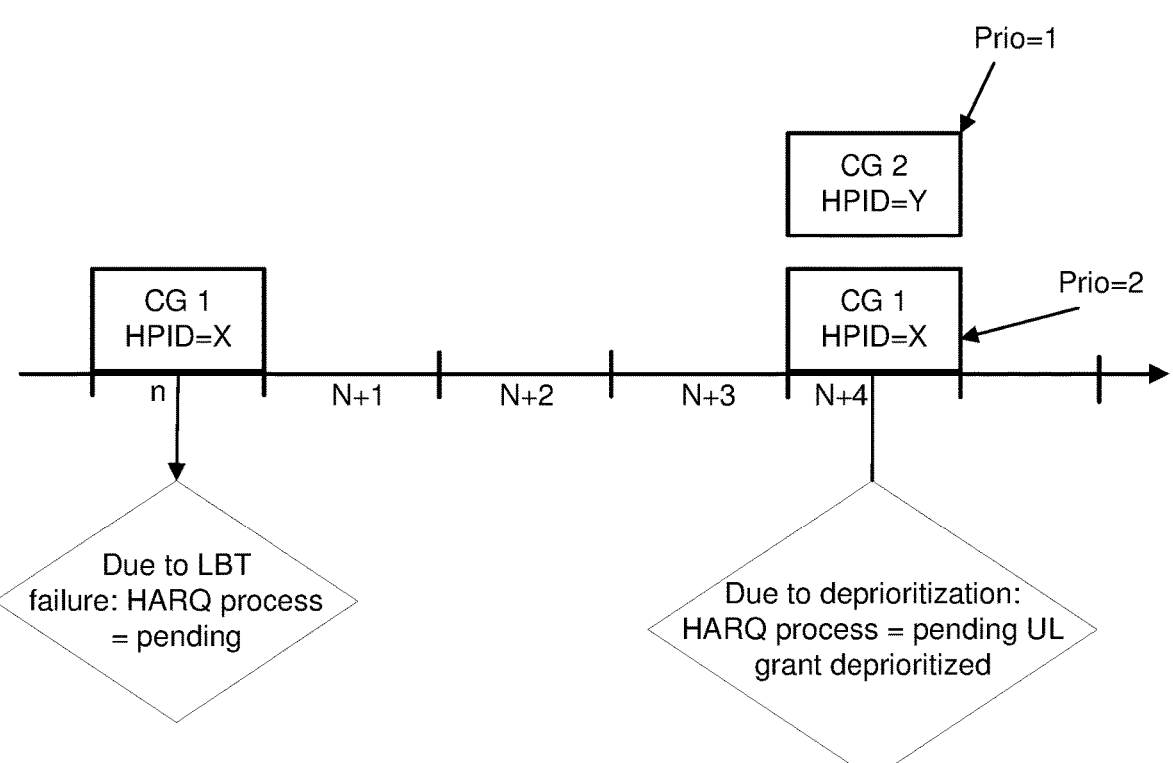

FIG. 4 is a timing diagram 400 illustrating one embodiment of a failed configured uplink grant. A UE and/or MAC has a configured uplink grant (e.g., CG 1 having a HARQ process identifier ("HPID") of X) in slot n. Due to an LBT failure—as notified by a lower layer—the corresponding transmission cannot take place in slot n. Accordingly, the associated HARQ process is switched to respectively considered as pending (e.g., autonomous retransmission is triggered). Slot n+4 provides an earliest transmission opportunity (e.g., configured uplink grant) where the autonomous retransmission may take place. In various embodiments, the UE may perform the autonomous retransmission in slot n+4 regardless of the existence of any overlapping uplink transmission which may carry higher priority data. In certain embodiments, the UE compares the priority of overlapping configured grants (e.g., CG 2) in slot n+4 with the priority of the autonomous retransmission (e.g., CG 1, TB pending in the HARQ buffer). Since CG 2 has a higher priority in this example (e.g., priority of CG 1 being higher than priority of CG 2), then the autonomous retransmission (e.g., TB pending for autonomous retransmission on CG 1), the UE will transmit the prioritized grant (e.g., CG 2), and postpone the autonomous retransmission to a later subsequent uplink configured grant satisfying the criteria for an autonomous retransmission.

In some embodiments, an UL grant associated with a HARQ process that is pending (e.g., LBT failure occurred for the corresponding UL grant and/or transmission) may always be considered as a prioritized UL grant. In such embodiments, both cg-RetransmissonTimer and lch-basedPrioritization are configured for a UE and/or MAC. Since the priority status of the UL grant cannot be changed to "deprioritized" as long as the associated HARQ process is pending, the UE and/or the MAC will only perform autonomous retransmissions specified for NR-U and not perform autonomous transmissions specified for IIoT functionality. Even if an autonomous retransmission is deprioritized and/or preempted by a higher priority colliding uplink transmission and/or grant, the corresponding UL grant may not be considered as deprioritized but instead as prioritized.

In various embodiments, an UL grant associated with a HARQ process for which an LBT failure occurred for the corresponding uplink transmission may be considered as a deprioritized UL grant. The associated HARQ process may be considered as not pending. In such embodiments, both cg-RetransmissonTimer and lch-basedPrioritization are configured for a UE and/or a MAC. Since the priority status of the UL grant is changed to "deprioritized" if an LBT failure was indicated by lower layers and a corresponding uplink transmission couldn't be performed, the UE and/or the MAC may trigger an autonomous transmission of the deprioritized UL grant on a subsequent configured grant for the same HARQ process. Moreover, in such embodiments, the UE and/or the MAC may not perform an autonomous retransmission of a pending transport block ("TB") since the HARQ process is considered as not pending.

In certain embodiments, an UL grant that is preempted and/or deprioritized by a higher priority overlapping uplink grant and/or uplink transmission may be considered as prioritized and an associated HARQ process may be considered as pending. In such embodiments, both cg-Retrans-missonTimer and lch-basedPrioritization are configured for a UE and/or a MAC. Since the HARQ process is considered as pending, the UE may perform an autonomous retrans-mission for the UL grant that was deprioritized on a subse-quent uplink resource (e.g., configured uplink grant) quali-fying for an autonomous retransmission. The autonomous retransmission functionality (e.g., NR-U) may be superior over an autonomous transmission functionality in terms of latency due to the fact that an autonomous retransmission can also take place on other configured grants as long as the transport block size matches. Hence, if latency is important, it may be beneficial to apply an autonomous retransmission (e.g., HARQ process is pending) even if an UL grant was deprioritized and/or preempted by another overlapping UL grant/transmission.

In some embodiments, an UL grant associated with a HARQ process which is pending (e.g., LBT failure occurred for a corresponding UL grant and/or transmission) may be considered as a prioritized UL grant if the priority of the UL grant is greater than or equal to a predefined threshold. The priority of an UL grant may be determined by the highest priority among priorities of logical channels with data available that are multiplexed or may be multiplexed in a MAC PDU, according to mapping restrictions. Since the priority status of the UL grant cannot be changed to "depri-oritized" as long as the associated HARQ process is pend-ing, the UE and/or the MAC may only perform autonomous retransmissions for NR-U and not perform autonomous transmissions for specified IIoT functionality. Even if an autonomous retransmission is deprioritized and/or pre-empted by a higher priority colliding uplink transmission and/or grant, the corresponding UL grant is not considered as deprioritized but as prioritized instead. Applying the autonomous retransmission procedure for high priority data may be beneficial since the autonomous retransmission functionality may have some advantages over the autono-mous transmission functionality (e.g., IIoT) in terms of latency.

In various embodiments, an UL grant associated with a HARQ process for which an LBT failure occurred for a corresponding uplink transmission may be considered as a deprioritized UL grant if the priority of the UL grant is lower than a predefined priority threshold. The associated HARQ process may be considered as not pending. In such embodi-ments, both cg-RetransmissonTimer and lch-basedPrioriti-zation may be configured for a UE and/or a MAC.

In certain embodiments, a network entity, such as a gNB, configures whether a configured grant configuration is con-figured with either autonomous transmissions (e.g., IIoT) or autonomous retransmissions (e.g., NR-U). For this embodi-ment, both cg-RetransmissonTimer and lch-basedPrioritiza-tion are configured for a UE and/or MAC. If the network entity has a configured grant configuration configured with autonomous retransmissions, the UE and/or the MAC may only perform autonomous retransmission if an uplink trans-mission cannot be performed due to either an LBT failure or deprioritization and/or preemption by a higher priority uplink grant and/or transmission. If the network entity has a configured grant configuration configured with autonomous transmissions, the UE and/or the MAC may only perform an autonomous transmission if LBT failure occurs for this CG or the configured grant was deprioritized and/or preempted by a higher priority uplink grant and/or transmission. In some embodiments, a new parameter is introduced in a ConfiguredGrantConfig IE (e.g., autonomousrecovery-r17—see Table 1) which indicates whether the autonomous transmission functionality (e.g., IIoT) or the autonomous retransmission functionality (e.g., NR-U) may be applied for the configured grant configuration.

TABLE 1

| ConfiguredGrantConfig Information Element | |
|---|---|
| -- ASN1START | |
| -- TAG-CONFIGUREDGRANTCONFIG-START | |
| ConfiguredGrantConfig ::= | SEQUENCE { |
| frequencyHopping | ENUMERATED {intraSlot, interSlot} |
| OPTIONAL, -- Need S | |
| cg-DMRS-Configuration | DMRS-UplinkConfig, |
| mcs-Table | ENUMERATED {qam256, qam64LowSE} |
| OPTIONAL, -- Need S | |
| mcs-TableTransformPrecoder | ENUMERATED {qam256, qam64LowSE} |
| OPTIONAL, -- Need S | |
| uci-OnPUSCH | SetupRelease { CG-UCI-OnPUSCH } |
| OPTIONAL, -- Need M | |
| resourceAllocation | ENUMERATED { |
| resourceAllocationType0, resourceAllocationType1, dynamicSwitch }, | |
| rbg-Size | ENUMERATED {config2} |
| OPTIONAL, -- Need S | |
| powerControlLoopToUse | ENUMERATED {n0, n1}, |
| p0-PUSCH-Alpha | P0-PUSCH-AlphaSetId, |
| transformPrecoder | ENUMERATED {enabled, disabled} |
| OPTIONAL, -- Need S | |
| nrofHARQ-Processes | INTEGER (1..16), |
| repK | ENUMERATED {n1, n2, n4, n8}, |
| repK-RV | ENUMERATED {s1-0231, s2-0303, s3- |
| 0000} | OPTIONAL, -- Need R |
| periodicity | ENUMERATED { |
| | sym2, sym7, sym1x14, |
| sym2x14, sym4x14, sym5x14, sym8x14, sym10x14, sym16x14, sym20x14, | |
| | sym32x14, sym40x14, |

TABLE 1-continued

ConfiguredGrantConfig Information Element

```
sym64x14, sym80x14, sym128x14, sym160x14, sym256x14, sym320x14, sym512x14,
                                                     sym640x14, sym1024x14,
sym1280x14, sym2560x14, sym5120x14, sym6, sym1x12, sym2x12,
sym4x12, sym5x12, sym8x12, sym10x12, sym16x12, sym20x12, sym32x12,
                                                     sym40x12, sym64x12,
sym80x12, sym128x12, sym160x12, sym256x12, sym320x12, sym512x12, sym640x12,
                                                     sym1280x12, sym2560x12
    },
    configuredGrantTimer                             INTEGER (1..64)
OPTIONAL, -- Need R
    rrc-ConfiguredUplinkGrant                        SEQUENCE {
        timeDomainOffset                             INTEGER (0..5119),
        timeDomainAllocation                         INTEGER (0..15),
        frequencyDomainAllocation                    BIT STRING (SIZE(18)),
        antennaPort                                  INTEGER (0..31),
        dmrs-SeqInitialization                       INTEGER (0..1)
OPTIONAL, -- Need R
        precodingAndNumberOfLayers                   INTEGER (0..63),
        srs-ResourceIndicator                        INTEGER (0..15)
OPTIONAL, -- Need R
        mcsAndTBS                                    INTEGER (0..31),
        frequencyHoppingOffset                       INTEGER (1..
maxNrofPhysicalResourceBlocks-1)                                 OPTIONAL, --
Need R
        pathlossReferenceIndex                       INTEGER (0..maxNrofPUSCH-
PathlossReferenceRSs-1),
        ...,
        [[
        pusch-RepTypeIndicator-r16                   ENUMERATED {pusch-
RepTypeA, pusch-RepTypeB}                                        OPTIONAL, -- Need M
        frequencyHoppingPUSCH-RepTypeB-r16           ENUMERATED {interRepetition,
interSlot}                                           OPTIONAL, -- Cond RepTypeB
        timeReferenceSFN-r16                         ENUMERATED {sfn512}
OPTIONAL -- Need S
        ]]
    }
OPTIONAL, -- Need R
    ...,
    [[
    cg-RetransmissionTimer-r16                       INTEGER (1..64)
OPTIONAL, -- Need R
    cg-minDFI-Delay-r16                              ENUMERATED
                                                         {sym7, sym1x14, sym2x14,
sym3x14, sym4x14, sym5x14, sym6x14, sym7x14, sym8x14,
                                                         sym9x14, sym10x14,
sym11x14, sym12x14, sym13x14, sym14x14, sym15x14, sym16x14
                                                         }
OPTIONAL, -- Need R
    cg-nrofPUSCH-InSlot-r16                          INTEGER (1..7)
OPTIONAL, -- Need R
    cg-nrofSlots-r16                                 INTEGER (1..40)
OPTIONAL, -- Need R
    cg-StartingOffsets-r16                           CG-StartingOffsets-r16
OPTIONAL, -- Need R
    cg-UCI-Multiplexing                              ENUMERATED {enabled}
OPTIONAL, -- Need R
    cg-COT-SharingOffset-r16                         INTEGER (1..39)
OPTIONAL, -- Need R
    betaOffsetCG-UCI-r16                             INTEGER (0..31)
OPTIONAL, -- Need R
    cg-COT-SharingList-r16                           SEQUENCE (SIZE (1..1709)) OF CG-
COT-Sharing-r16                                      OPTIONAL, -- Need R
    harq-ProcID-Offset-r16                           INTEGER (0..15)
OPTIONAL, -- Need M
    harq-ProcID-Offset2-r16                          INTEGER (0..15)
OPTIONAL, -- Need M
    configuredGrantConfigIndex-r16                   ConfiguredGrantConfigIndex-r16
OPTIONAL, -- Cond CG-List
    configuredGrantConfigIndexMAC-r16               ConfiguredGrantConfigIndexMAC-
r16                                                  OPTIONAL, -- Cond CG-List
    periodicityExt-r16                               INTEGER (1..5120)
OPTIONAL, -- Need R
    startingFromRV0-r16                              ENUMERATED {on, off}
OPTIONAL, -- Need R
    phy-PriorityIndex-r16                            ENUMERATED {p0, p1}
OPTIONAL, -- Need R
```

TABLE 1-continued

| ConfiguredGrantConfig Information Element | |
| --- | --- |
| autonomousrecovery-r17 | CHOICE { |
| autonomousTx | NULL, |
| autonomousReTx | NULL, |
| }, | |
| | OPTIONAL -- Cond LCH- |
| BasedPrioritization | |
| | -- Cond CG-RetransmissionTimer |
| ]] | |
| } | |

In various embodiments, a UE performs only autonomous retransmissions (e.g., NR-U) (e.g., HARQ process is pending) for any further UL transmissions on this configured grant configuration if an LBT failure occurs for a corresponding uplink transmission and no preemption and/or deprioritization by a higher priority UL grant and/or transmission has happened before for this configured grant configuration. In certain embodiments, a UE may—once LBT failure has occurred—refrain from applying autonomous transmissions for this configured grant configuration. Essentially even if a configured grant of this configured grant configuration is deprioritized and/or preempted by a higher priority UL grant and/or transmission, the UE may consider the UL grant as prioritized and further consider the associated HARQ process as pending (e.g., triggering an autonomous retransmission).

In certain embodiments, a UE performs only autonomous transmissions (e.g., IIoT) (e.g., UL grant is considered as deprioritized) for any further UL transmissions on this configured grant configuration if a preemption and/or deprioritization by a higher priority UL grant and/or transmission occurs for a CG of this configured grant configuration and no LBT failure has happened before for this configured grant configuration. In such embodiments, the UE may—once deprioritization and/or preemption took place—refrain from applying autonomous retransmissions for this configured grant configuration. Therefore, even if a LBT failures occurs, the UE may consider the corresponding UL grant (e.g., CG) as deprioritized and further consider the associated HARQ process as not pending (e.g., triggering an autonomous transmission).

In some embodiments, if HARQ processes are shared among different configured grants on the same BWP, a CG-RetransmissionTimer may be set to the same value for all CG configurations on the BWP. In such embodiments, the CG-RetransmissionTimer may be set to the same value for all CG configurations sharing the HARQ processes on the BWP.

In various embodiments, a UE selects the smallest CG-retransmission value among the CG configurations sharing the HARQ processes if a CG-RetransmissionTimer is not set to the same value for all of CG configurations on a BWP.

In certain embodiments, a network configures, for a configured grant configuration, whether a UE implementation selects a HARQ process identifier ("ID") among the HARQ process IDs available for a configured grant configuration or whether the HARQ process is determined according to some formula (e.g., HARQ process ID associated with the first symbol of a UL transmission is derived from the following equation): HARQ Process ID=[floor(CURRENT_symbol/periodicity)] modulo nrofHARQ-Processes+harq-ProcID-Offset2.

In some embodiments, a UE indicates a HARQ process ID and new data indicator ("NDI"), e.g., within the CG-UCI, even if the HARQ process ID is derived based on some formula.

In various embodiments, a UE may postpone the transmission of a pending HARQ process or a retransmission and prioritize the transmission of a new initial transmission if a priority of data included in a new TB is higher than the priority of the TB for the pending HARQ process and/or retransmission. In certain embodiments, a UE may always prioritize retransmissions over new transmissions (e.g., UE selects a pending HARQ process before transmitting a new (e.g., initial) transmission). However, in some embodiments, if a UE has higher priority data in its buffer, such as URLLC traffic, the UE may transmit high priority data and postpone the transmission of a lower priority TB for a pending HARQ process. Therefore, in various embodiments, a UE compares the priority of a TB for a pending HARQ process with the priority of data pending in the UE for new transmission before selecting a HARQ process for transmission. If a CG uplink resource may be either used for an autonomous retransmission (e.g., pending HARQ process), or for a new transmission, the UE may prioritize higher priority data and select a HARQ process accordingly. The priority of an uplink transmission may be determined by the highest priority among priorities of logical channels with data available that are multiplexed (e.g., for retransmission) or may be multiplexed in the MAC PDU (e.g., for new transmission), according to mapping restrictions. A retransmission (e.g., autonomous retransmission due to LBT failure or a retransmission triggered by the expiry of the CG-RetransmissionTimer) may be pre-empted and/or deprioritized by higher priority data that is available for transmission in the UE, the UE postpones the retransmission to a subsequent CG resource. In certain embodiments, a UE restarts a CG-RetransmissionTimer if a retransmission could not be performed due to higher priority data that is available for transmission. In some embodiments, a HARQ process may be considered as pending if a (autonomous) retransmission could not be performed due to higher priority data that is available for a new transmission (e.g., retransmission is pre-empted by a higher priority new transmission).

In various embodiments, a network entity, such as a gNB, configures a UE/MAC about whether the UE will always prioritize retransmissions over new transmission when performing HARQ process selection or whether the UE will prioritize retransmission versus new transmission based on priority of data (e.g., UE postpones the transmission of a pending HARQ process and prioritizes the transmission of a new initial transmission if the priority of the data included in the new TB is higher than the priority of the TB for the pending HARQ process).

Figure 5:
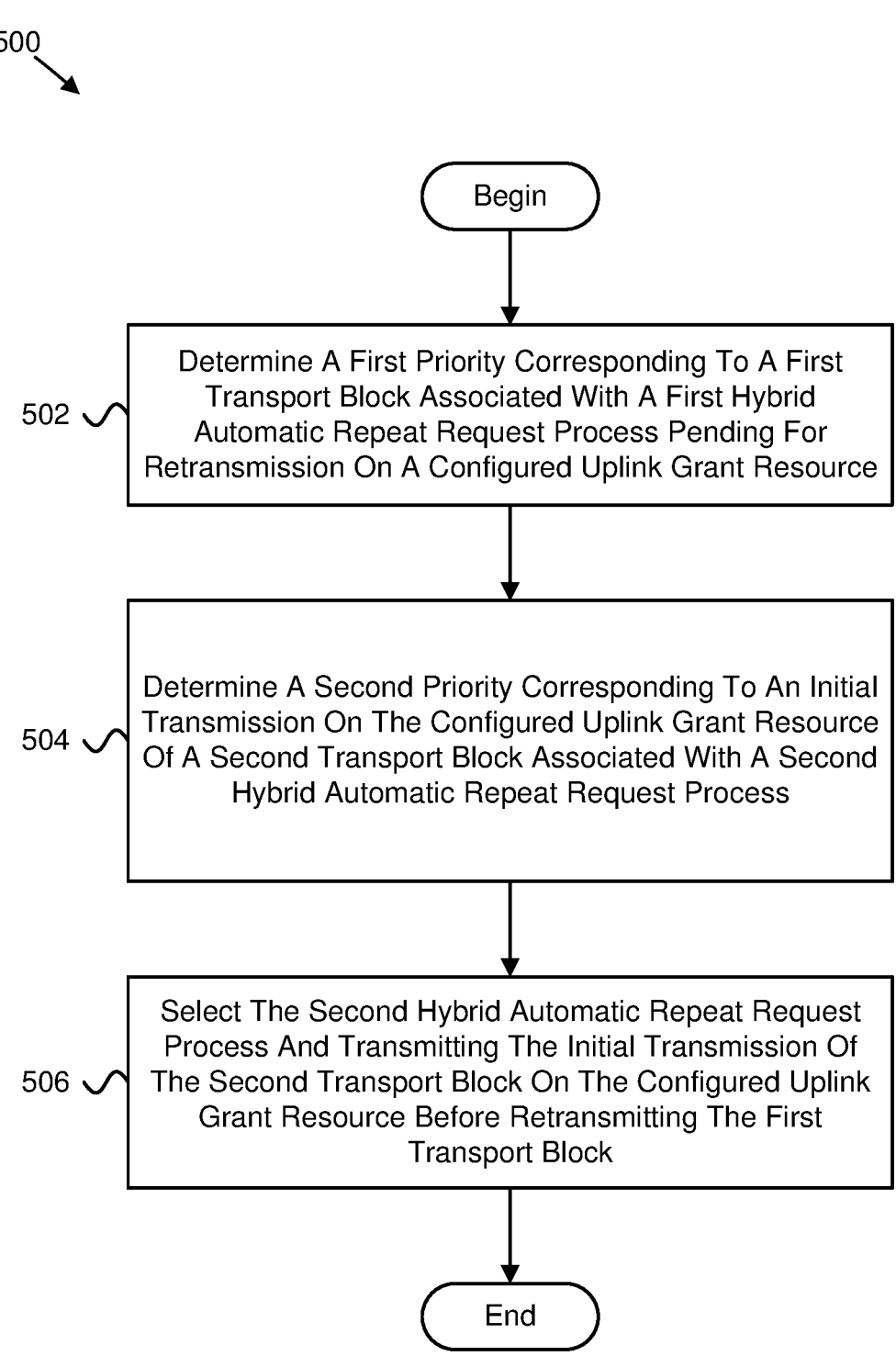
FIG. 5 is a flow chart diagram illustrating one embodiment of a method for transmitting a prioritized transport block.

FIG. 5 is a flow chart diagram illustrating one embodiment of a method 500 for transmitting a prioritized transport block. In some embodiments, the method 500 is performed by an apparatus, such as the remote unit 102. In certain embodiments, the method 500 may be performed by a processor executing program code, for example, a microcontroller, a microprocessor, a CPU, a GPU, an auxiliary processing unit, a FPGA, or the like.

In various embodiments, the method 500 includes determining 502, at a user equipment, a first priority corresponding to a first transport block associated with a first hybrid automatic repeat request process pending for retransmission on a configured uplink grant resource. In some embodiments, the method 500 includes determining 504 a second priority corresponding to an initial transmission on the configured uplink grant resource of a second transport block associated with a second hybrid automatic repeat request process. In certain embodiments, the method 500 includes selecting 506 the second hybrid automatic repeat request process and transmitting the initial transmission of the second transport block on the configured uplink grant resource before retransmitting the first transport block.

In certain embodiments, selecting the second hybrid automatic repeat request process and transmitting the initial transmission of the second transport block on the configured uplink grant resource before retransmitting the first transport block associated with the first hybrid automatic repeat request process comprises transmitting the initial transmission of the second transport block before retransmitting the first transport block in response to the second priority being higher than the first priority. In some embodiments, the method 500 further comprises receiving configuration information indicating to transmit a higher priority new transmission before transmitting a lower priority retransmission. In various embodiments, the method 500 further comprises, in response to the first hybrid automatic repeat request process and the second hybrid automatic repeat request process configured to use the configured grant resource, receiving configuration information indicating to select the first hybrid automatic repeat request process and transmit the retransmission of the first transport block regardless of the first priority and the second priority.

In one embodiment, the method 500 further comprises restarting a timer associated with the configured grant uplink resource in response to transmitting the initial transmission of the second transport block before retransmitting the first transport block. In certain embodiments, after transmitting the initial transmission of the second transport block, the first hybrid automatic repeat request process associated with the data corresponding to the first transport block is considered as pending. In some embodiments, after transmitting the initial transmission of the second transport block, the method comprises retransmitting the first transport block associated with the first hybrid automatic repeat request process on next available configured uplink grant resources associated with the first hybrid automatic repeat request process.

In various embodiments, transmitting the initial transmission of the second transport block before retransmitting the first transport block comprises transmitting the initial transmission of the second transport block in a configured grant uplink resource. In one embodiment, the first priority and the second priority correspond to logical channel priorities. In certain embodiments, second data corresponding to the second transport block is received after first data corresponding to the first transport block.

FIG. 6 is a flow chart diagram illustrating one embodiment of a method 600 for transmitting a prioritized transport block. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

In various embodiments, the method 600 includes receiving 602 configuration information indicating to transmit a higher priority new transmission before transmitting a lower priority retransmission. In certain embodiments, the method 600 includes determining 604, at a user equipment, a first priority corresponding to a first transport block associated with a first hybrid automatic repeat request process pending for retransmission on a configured uplink grant resource. In some embodiments, the method 600 includes determining 606 a second priority corresponding to an initial transmission on the configured uplink grant resource of a second transport block associated with a second hybrid automatic repeat request process. In certain embodiments, the method 600 includes selecting 608 the second hybrid automatic repeat request process and transmitting the initial transmission of the second transport block on the configured uplink grant resource before retransmitting the first transport block. In some embodiments, the method 600 includes restarting 610 a timer associated with the configured grant uplink resource in response to transmitting the initial transmission of the second transport block before retransmitting the first transport block.

In one embodiment, a method of a user equipment comprises: determining a first priority corresponding to a first transport block associated with a first hybrid automatic repeat request process pending for retransmission on a configured uplink grant resource; determining a second priority corresponding to an initial transmission on the configured uplink grant resource of a second transport block associated with a second hybrid automatic repeat request process; and selecting the second hybrid automatic repeat request process and transmitting the initial transmission of the second transport block on the configured uplink grant resource before retransmitting the first transport block.

In certain embodiments, selecting the second hybrid automatic repeat request process and transmitting the initial transmission of the second transport block on the configured uplink grant resource before retransmitting the first transport block associated with the first hybrid automatic repeat request process comprises transmitting the initial transmission of the second transport block before retransmitting the first transport block in response to the second priority being higher than the first priority.

In some embodiments, the method further comprises receiving configuration information indicating to transmit a higher priority new transmission before transmitting a lower priority retransmission.

In various embodiments, the method further comprises, in response to the first hybrid automatic repeat request process and the second hybrid automatic repeat request process configured to use the configured grant resource, receiving configuration information indicating to select the first hybrid automatic repeat request process and transmit the retransmission of the first transport block regardless of the first priority and the second priority.

In one embodiment, the method further comprises restarting a timer associated with the configured grant uplink resource in response to transmitting the initial transmission of the second transport block before retransmitting the first transport block.

In certain embodiments, after transmitting the initial transmission of the second transport block, the first hybrid automatic repeat request process associated with the data corresponding to the first transport block is considered as pending.

In some embodiments, after transmitting the initial transmission of the second transport block, the method comprises retransmitting the first transport block associated with the first hybrid automatic repeat request process on next available configured uplink grant resources associated with the first hybrid automatic repeat request process.

In various embodiments, transmitting the initial transmission of the second transport block before retransmitting the first transport block comprises transmitting the initial transmission of the second transport block in a configured grant uplink resource.

In one embodiment, the first priority and the second priority correspond to logical channel priorities.

In certain embodiments, second data corresponding to the second transport block is received after first data corresponding to the first transport block.

In one embodiment, an apparatus comprises a user equipment. The apparatus further comprises: a transmitter; and a processor that: determines a first priority corresponding to a first transport block associated with a first hybrid automatic repeat request process pending for retransmission on a configured uplink grant resource; determines a second priority corresponding to an initial transmission on the configured uplink grant resource of a second transport block associated with a second hybrid automatic repeat request process; and selects the second hybrid automatic repeat request process, wherein the transmitter transmits the initial transmission of the second transport block on the configured uplink grant resource before retransmitting the first transport block.

In certain embodiments, the processor selecting the second hybrid automatic repeat request process and the transmitter transmitting the initial transmission of the second transport block on the configured uplink grant resource before retransmitting the first transport block associated with the first hybrid automatic repeat request process comprises the transmitter transmitting the initial transmission of the second transport block before retransmitting the first transport block in response to the second priority being higher than the first priority.

In some embodiments, the apparatus further comprises a receiver that receives configuration information indicating to transmit a higher priority new transmission before transmitting a lower priority retransmission.

In various embodiments, the apparatus further comprises a receiver that, in response to the first hybrid automatic repeat request process and the second hybrid automatic repeat request process configured to use the configured grant resource, receives configuration information indicating to select the first hybrid automatic repeat request process, wherein the transmitter transmits the retransmission of the first transport block regardless of the first priority and the second priority.

In one embodiment, the processor restarts a timer associated with the configured grant uplink resource in response to the transmitter transmitting the initial transmission of the second transport block before retransmitting the first transport block.

In certain embodiments, after transmitting the initial transmission of the second transport block, the first hybrid automatic repeat request process associated with the data corresponding to the first transport block is considered as pending.

In some embodiments, after transmitting the initial transmission of the second transport block, the transmitter retransmits the first transport block associated with the first hybrid automatic repeat request process on next available configured uplink grant resources associated with the first hybrid automatic repeat request process.

In various embodiments, the transmitter transmitting the initial transmission of the second transport block before retransmitting the first transport block comprises the transmitter transmitting the initial transmission of the second transport block in a configured grant uplink resource.

In one embodiment, the first priority and the second priority correspond to logical channel priorities.

In certain embodiments, second data corresponding to the second transport block is received after first data corresponding to the first transport block.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of a user equipment (UE), the method comprising:
   determining a first priority of a first hybrid automatic repeat request (HARQ) process associated with a first transport block pending for retransmission on a configured uplink grant resource, wherein the first priority is a first logical channel priority;
   determining a second priority for a second HARQ process corresponding to an initial transmission of a second transport block on the configured uplink grant resource, wherein the second priority is a second logical channel priority and wherein determining the second priority comprises determining a transmission urgency of the second transport block based on one or more UE-side transmission conditions associated with a configured uplink grant; and
   selecting the second HARQ process corresponding to the initial transmission of the second transport block over the first HARQ process associated with the first transport block pending for retransmission based on the second logical channel priority.

2. The method of claim 1, wherein selecting the second HARQ process and transmitting the initial transmission of the second transport block on the configured uplink grant resource before retransmitting the first transport block associated with the first HARQ process comprises transmitting the initial transmission of the second transport block before retransmitting the first transport block in response to the second priority being higher than the first priority.

3. The method of claim 1, further comprising receiving configuration information indicating to select a higher priority HARQ process and transmitting a new transmission before transmitting a lower priority retransmission.

4. The method of claim 1, further comprising, in response to the first HARQ process and the second HARQ process configured to use the configured grant resource, receiving configuration information indicating to select the first HARQ process and transmit the retransmission of the first transport block regardless of the first priority and the second priority.

5. The method of claim 1, further comprising restarting a timer associated with the configured grant uplink resource in response to transmitting the initial transmission of the second transport block before retransmitting the first transport block.

6. The method of claim 1, wherein, after transmitting the initial transmission of the second transport block, the first HARQ process associated with data corresponding to the first transport block is considered as pending.

7. The method of claim 1, further comprising, after transmitting the initial transmission of the second transport block, retransmitting the first transport block associated with the first HARQ process on next available configured uplink grant resources associated with the first HARQ process.

8. The method of claim 1, wherein second data corresponding to the second transport block is received after first data corresponding to the first transport block.

9. A user equipment (UE), comprising:

at least one memory; and at least one processor coupled with the at least one memory and configured to cause the UE to:

determine a first priority of a first hybrid automatic repeat request (HARQ) process associated with a first transport block pending for retransmission on a configured uplink grant resource, wherein the first priority is a first logical channel priority;

determine a second priority for a second HARQ process corresponding to an initial transmission of a second transport block on the configured uplink grant resource, wherein the second priority is a second logical channel priority and wherein determining the second priority comprises determining a transmission urgency of the second transport block based on one or more UE-side transmission conditions associated with a configured uplink grant; and select the second HARQ process corresponding to the initial transmission of the second transport block over the first HARQ process associated with the first transport block pending for retransmission based on the second logical channel priority.

10. The UE of claim 9, wherein the at least one processor is configured to cause the UE to transmit the initial transmission of the second transport block before retransmitting the first transport block in response to the second priority being higher than the first priority.

11. The UE of claim 9, wherein the at least one processor is configured to cause the UE to receive configuration information indicating to transmit a higher priority new transmission before transmitting a lower priority retransmission.

12. The UE of claim 9, wherein the at least one processor is configured to cause the UE to, in response to the first HARQ process and the second HARQ process configured to use the configured grant resource, receive configuration information indicating to select the first HARQ process, and transmit the retransmission of the first transport block regardless of the first priority and the second priority.

13. The UE of claim 9, wherein, after transmitting the initial transmission of the second transport block, the first HARQ process associated with data corresponding to the first transport block is considered as pending.

14. The UE of claim 9, wherein, after transmitting the initial transmission of the second transport block, the at least one processor is configured to cause the UE to retransmit the first transport block associated with the first HARQ process on next available configured uplink grant resources associated with the first HARQ process.

15. The UE of claim 9, wherein second data corresponding to the second transport block is received after first data corresponding to the first transport block.

16. The method of claim 1, further comprising transmitting the initial transmission of the second transport block on the configured uplink grant resource before retransmitting the first transport block.

17. The method of claim 1, wherein the first priority and the second priority are determined by a priority of corresponding logical channels.

18. The method of claim 1, wherein transmitting the initial transmission of the second transport block before retransmitting the first transport block comprises transmitting the initial transmission of the second transport block in a configured grant uplink resource.

19. The UE of claim 9, wherein the at least one processor is configured to cause the UE to transmit the initial transmission of the second transport block on the configured uplink grant resource before retransmitting the first transport block.

20. The UE of claim 9, wherein the first priority and the second priority are determined by a priority of corresponding logical channels.

* * * * *